(12) United States Patent
Morita

(10) Patent No.: US 9,060,090 B2
(45) Date of Patent: Jun. 16, 2015

(54) ELECTRONIC APPARATUS AND IMAGE FORMING APPARATUS

(71) Applicant: KYOCERA Document Solutions Inc., Osaka (JP)

(72) Inventor: Keiko Morita, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/108,049

(22) Filed: Dec. 16, 2013

(65) Prior Publication Data

US 2014/0176977 A1    Jun. 26, 2014

(30) Foreign Application Priority Data

Dec. 21, 2012  (JP) ................................ 2012-280189

(51) Int. Cl.
*H04N 1/00* (2006.01)
*G06F 3/12* (2006.01)

(52) U.S. Cl.
CPC ....... *H04N 1/00896* (2013.01); *H04N 1/00323* (2013.01); *H04N 2201/0094* (2013.01)

(58) Field of Classification Search
CPC .......... H04N 1/00323; H04N 1/00928; H04N 1/00891; H04N 1/32657; H04N 1/32625; G06F 1/3206; G06F 1/3231; G06F 1/3284; G03G 15/5004; Y02B 60/1267

USPC ........ 358/1.11–1.18; 713/300, 310, 320, 323, 713/324, 330, 340; 399/75, 81
See application file for complete search history.

(56) References Cited

U.S. PATENT DOCUMENTS

2010/0277762 A1* 11/2010 Eguchi et al. ................ 358/1.15
2012/0204046 A1*  8/2012 Baba et al. .................... 713/323
2012/0327458 A1* 12/2012 Baba et al. ................... 358/1.15

FOREIGN PATENT DOCUMENTS

JP        11202690 A  *  7/1999
JP     2002-251108 A      9/2002

* cited by examiner

*Primary Examiner* — Chad Dickerson
(74) *Attorney, Agent, or Firm* — Knobbe, Martens, Olson & Bear LLP

(57) ABSTRACT

An image forming apparatus includes: an operating section; a plurality of human body sensors configured to detect an operator and issue a detection signal; an operation recording section configured to record whether the operating section has been operated within a predetermined time of detection; a setting section configured to, based on an operation history recorded in the operation recording section, set as a sleep non-cancel sensor, out of the human body sensors, a sensor for which an operation of the operating section within the predetermined time of detection occurred with a low frequency; and a mode shift section which, when, during a sleep mode of the apparatus, receiving the detection signal from the sleep non-cancel sensor, maintains the apparatus in the sleep mode and, when, during the sleep mode, receiving the detection signal from the sensor other than the sleep non-cancel sensor, shift the apparatus to the normal operation mode.

7 Claims, 6 Drawing Sheets

OPERATING SECTION OPERATED

OPERATING SECTION NOT OPERATED

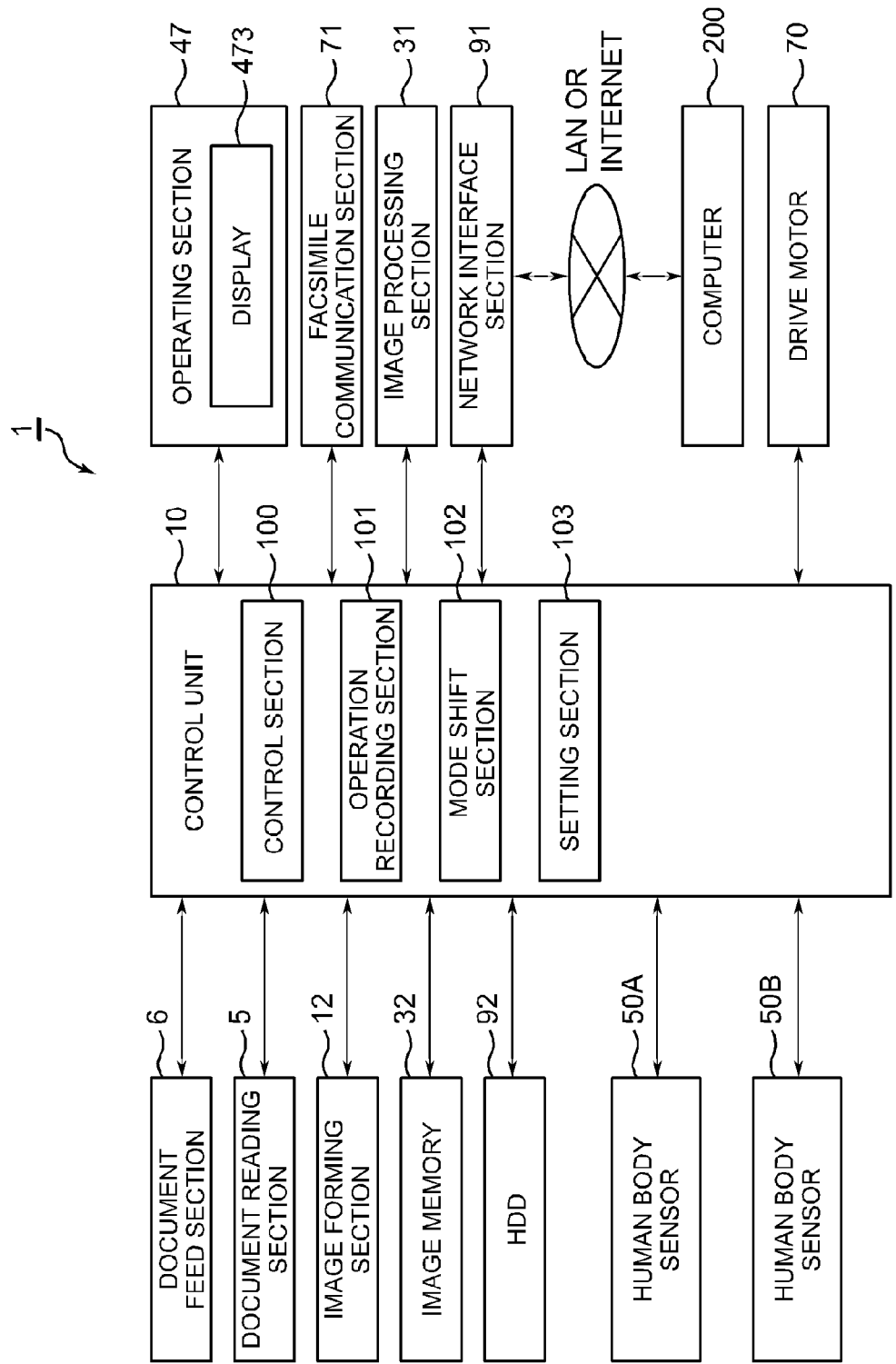

OPERATING SECTION OPERATED

OPERATING SECTION NOT OPERATED

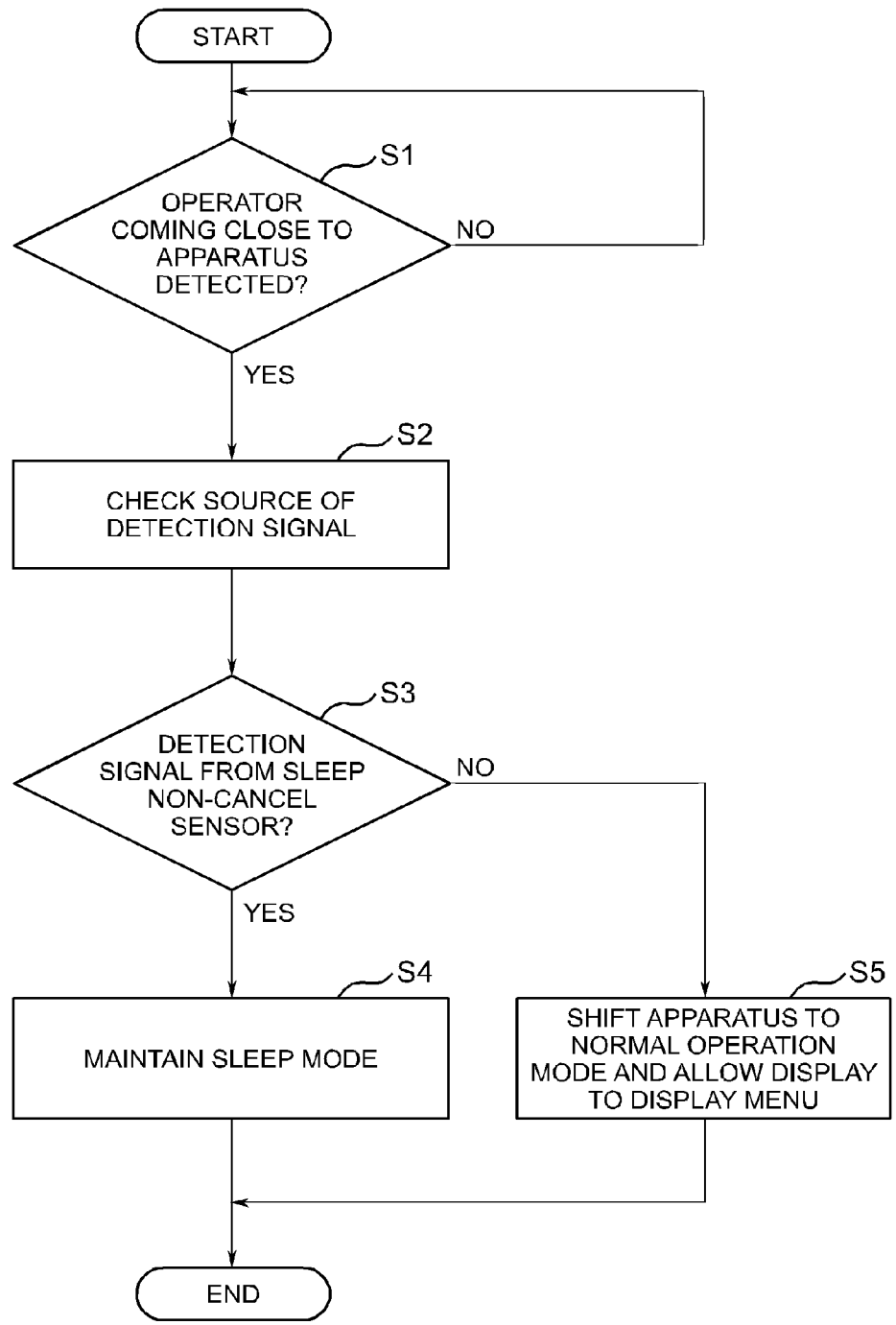

ELECTRONIC APPARATUS AND IMAGE FORMING APPARATUS

INCORPORATION BY REFERENCE

This application claims priority to Japanese Patent Application No. 2012-280189 filed on Dec. 21, 2012, the entire contents of which are incorporated by reference herein.

BACKGROUND

The present disclosure relates to electronic apparatuses and image forming apparatuses and particularly relates to a power-saving technique for an image forming apparatus.

Electronic apparatuses, such as image forming apparatuses, can shift the operation mode from a normal operation mode to a sleep mode for saving power, such as while not performing image formation, in order to reduce power consumption of a fixing device for fixing a toner image on a recording paper sheet, a display, and so on. Many image forming apparatuses are configured to detect an operator with a human body sensor, shift the operation mode to the sleep mode when the operator moves away from the image forming apparatus, and automatically return from the sleep mode to the normal operation mode when the operator comes close to the image forming apparatus. For example, there is proposed an image forming apparatus configured to prevent it from shifting to the sleep mode despite operator's intention while being operated by the operator, thus improving operator convenience.

SUMMARY

A technique improved over the aforementioned technique is proposed as one aspect of the present disclosure.

An electronic apparatus according to the one aspect of the present disclosure includes: an operating section; a plurality of human body sensors; a mode shift section; an operation recording section; and a setting section.

The operating section is configured to receive an operation command from an operator.

The plurality of human body sensors are configured to detect an operator coming close to the electronic apparatus and thus issue a detection signal and disposed at different locations on the front side of the electronic apparatus.

The mode shift section is configured to, based on the presence or absence of the detection signal from the human body sensor, shift the electronic apparatus from a normal operation mode allowing the electronic apparatus to normally operate to a sleep mode for saving power, or vice versa.

The operation recording section is configured to, for each of the human body sensors, record as an operation history whether or not the operating section has been operated within a predetermined time of the human body sensor detecting an operator coming close to the electronic apparatus.

The setting section is configured to, based on the operation history recorded in the operation recording section, set as a sleep non-cancel sensor uninvolved in cancelling the sleep mode, out of the plurality of human body sensors, a human body sensor for which an operation of the operating section within the predetermined time of detecting an operator coming close to the electronic apparatus occurred with a frequency not higher than a predetermined value.

Furthermore, the mode shift section is configured to, when, during the sleep mode of the electronic apparatus, receiving the detection signal from the sleep non-cancel sensor set by the setting section, maintain the electronic apparatus in the sleep mode and, when, during the sleep mode, receiving the detection signal from the human body sensor other than the sleep non-cancel sensor, shift the electronic apparatus to the normal operation mode.

An image forming apparatus according to another aspect of the present disclosure is the above electronic apparatus and includes an image forming section.

The image forming section is configured to form an image on a recording medium.

BRIEF DESCRIPTION OF THE DRAWINGS

FIG. 3 is a functional block diagram showing an essential internal architecture of the image forming apparatus.

FIG. 6 is a flowchart showing operation mode shift processing in the image forming apparatus.

DETAILED DESCRIPTION

Figure 1:
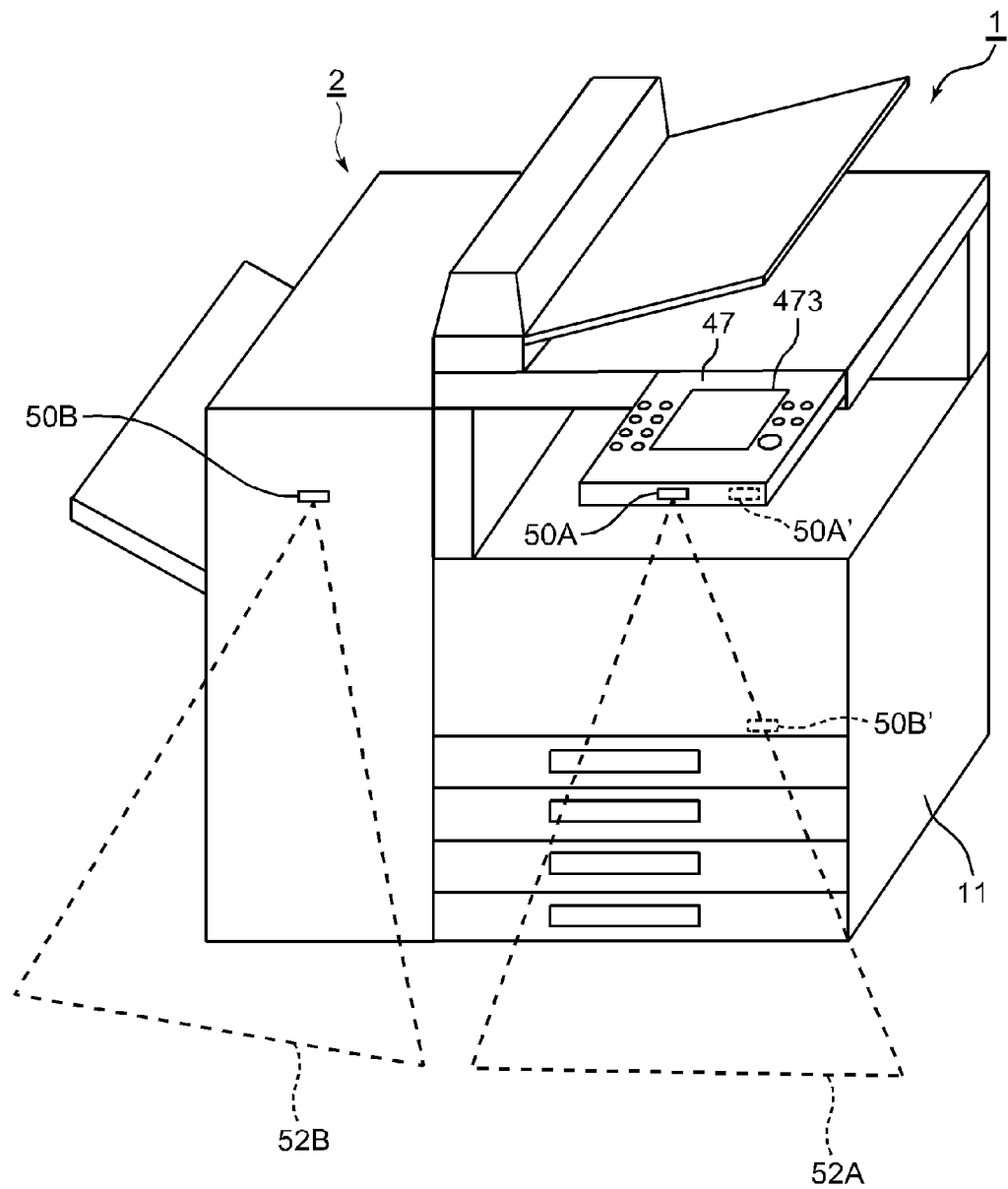
FIG. 1 is a perspective view showing the appearance of an image forming apparatus according to one embodiment of the present disclosure and the sensing ranges of human body sensors of the image forming apparatus.

Hereinafter, a description will be given of an image forming apparatus as an electronic apparatus according to one embodiment of the present disclosure with reference to the drawings. FIG. 1 is a perspective view showing the appearance of an image forming apparatus 1 according to one embodiment of the present disclosure and the sensing ranges of human body sensors of the image forming apparatus 1.

The image forming apparatus 1 according to the one embodiment of the present disclosure is a multifunction peripheral having multiple functions including, for example, a copy function, a print function, a scan function, and a facsimile function. An apparatus body 11 of the image forming apparatus 1 is connected on the left side to a post-processing device 2 configured to perform paper discharge processing after the image formation.

The apparatus body 11 of the image forming apparatus 1 is provided with an operating section 47. The operating section 47 includes various keys and is configured to receive, with key input, operator's commands for various types of operations and processing executable by the image forming apparatus 1, such as a command to execute an image forming operation and a command to execute a document reading operation. The operating section 47 includes a display 473. The display 473 is formed of an LCD (liquid crystal display) having a touch panel function.

The image forming apparatus 1 can be shifted from a normal operation mode capable of normally operating to a sleep mode for saving power or vice versa by a mode shift section 102 (see FIG. 3) to be described later. While the image forming apparatus 1 is in the normal operation mode, the display 473, under the control of a control section 100 (FIG. 3) to be described later, displays images of various screens, such as an operating screen, a preview screen, and a screen for checking the status of a print job. On the other hand, while the image forming apparatus 1 is in the sleep mode, the display 473 is in an image non-display state where it displays no image.

A plurality of human body sensors are disposed at appropriate locations on the front side of the image forming apparatus 1 and configured to detect an operator of the image forming apparatus 1 as an object to be detected. In this embodiment, the image forming apparatus 1 is provided with two human body sensors, i.e., a human body sensor 50A disposed at the operating section 47 on the front side of the image forming apparatus 1 and a human body sensor 50B disposed at an upper portion of the front surface of the post-processing device 2 constituting part of the image forming apparatus 1. The mode shift section 102 is configured to, when the human body sensor 50A or the human body sensor 50B detects an operator (a human body) during the sleep mode of the image forming apparatus 1, shift the image forming apparatus 1 to the normal operation mode. Thus, the display 4 is turned into an image display state and becomes ready to receive a touch input of the operator through the touch panel function.

The human body sensor 50A has a sensing range 52A. The human body sensor 50B has a sensing range 52B. If, as described above, the human body sensors 50A and 50B are arranged at horizontally different locations (at the right and left of the image forming apparatus 1 in this embodiment), an operator coming close to the image forming apparatus 1 can be detected across a region in front of the image forming apparatus 1.

Each of the human body sensors 50A and 50B is composed of, for example, a pyroelectric infrared sensor (not shown) and a control substrate (not shown) therefor. The pyroelectric infrared sensor includes a pyroelectric element in which electrodes are provided on both surfaces of a substrate having a pyroelectric effect, and is configured to detect an object (a human body or any other body) within a predetermined sensing range using the pyroelectric element. Specifically, the pyroelectric infrared sensor includes a pyroelectric element which is composed of a pyroelectric substrate made of a ferroelectric or the like and a pair of opposed electrodes provided on both sides of the pyroelectric substrate, and is configured to collect infrared rays generated by an action of a human body to a light receiving portion of the pyroelectric element and convert a signal resulting from a polarization of the pyroelectric element caused depending upon change in infrared rays to a voltage signal. Furthermore, when the voltage signal having undergone predetermined processing is high or low in comparison with a threshold value using a comparator, the pyroelectric infrared sensor regards an object as having been detected and outputs a signal indicating the high level or the low level.

The sensing distance of the human body sensors 50A and 50B is preferably about 1 m in order to avoid that a human body far away from the image forming apparatus 1 is detected as an operator.

However, the type of human body sensor is not limited to the pyroelectric infrared sensor and other types of sensors capable of detecting a human body are also applicable to the image forming apparatus 1. For example, the human body sensor may be an optical sensor which includes a light-emitting section capable of emitting light in front of the image forming apparatus 1 and a light-receiving section capable of receiving the reflection of the light from the light-emitting section on the human body and outputs a detection signal representing the presence of the human body when the receiving section receives the reflected light.

Figure 2:
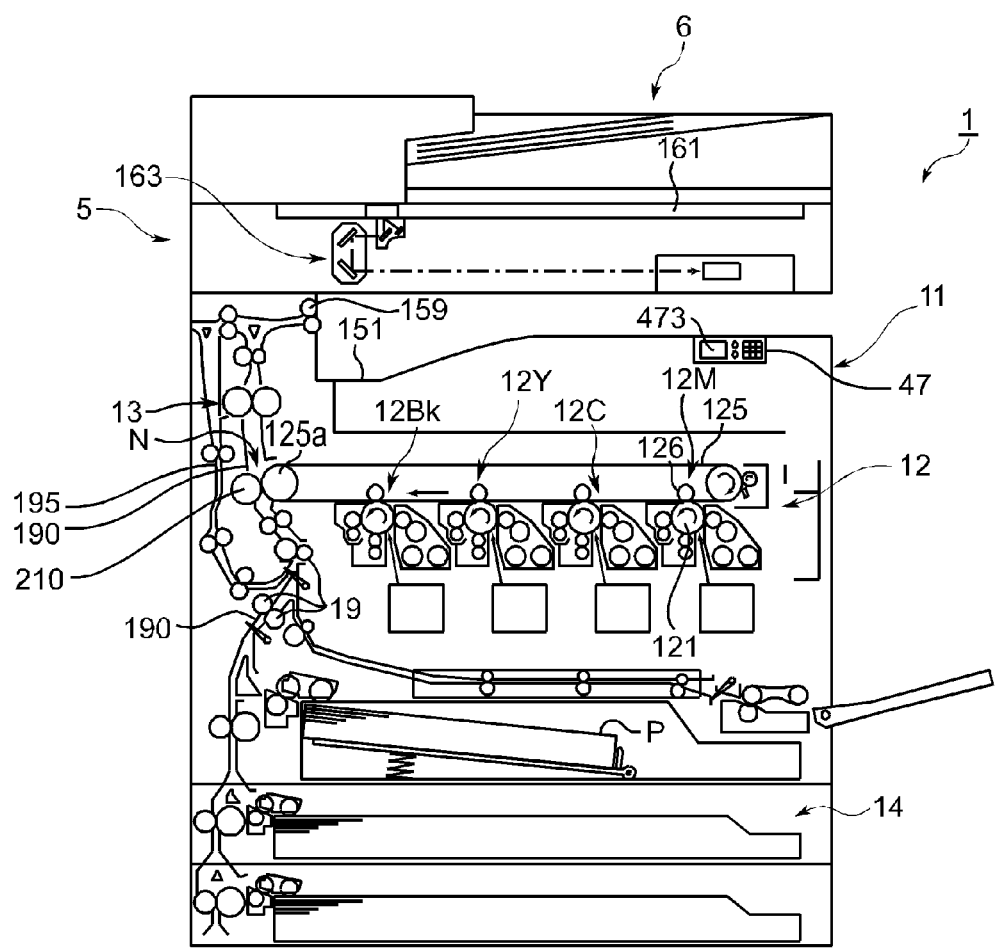
FIG. 2 is a front cross-sectional view showing the structure of the image forming apparatus.

FIG. 2 is a front cross-sectional view showing the structure of the image forming apparatus 1. The image forming apparatus 1 is made up so that the apparatus body 11 includes the operating section 47, an image forming section 12, a fixing section 13, a paper feed section 14, a document feed section 6, a document reading section 5, and so on.

In a document reading operation of the image forming apparatus 1, the document reading section 5 optically reads an image of an original document being fed from the document feed section 6 or an image of an original document placed on an original glass plate 161 to generate image data. The image data generated by the document reading section 5 is stored on an internal HDD, a network-connected computer or the like.

In an image forming operation of the image forming apparatus 1, the image forming section 12 forms a toner image on a recording paper sheet P serving as a recording medium fed from the paper feed section 14, based on image data generated by the document reading operation, image data received from a network-connected computer or image data stored on the internal HDD. In the case of color printing, an image forming unit 12M for magenta, an image forming unit 12C for cyan, an image forming unit 12Y for yellow, and an image forming unit 12Bk for black of the image forming section 12 form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and a drive roller 125a with the intermediate transfer belt 125 in between, to a recording paper sheet P conveyed from the paper feed section 14 along a conveyance path 190. Thereafter, the fixing section 13 fixes the toner image on the recording paper sheet P by the application of heat and pressure. The recording paper sheet P on which a multicolor image has been fixed by the completion of the fixing treatment is discharged to a paper output tray 151.

In the case of double-sided printing of the image forming apparatus 1, the recording paper sheet P having an image already printed on one side by the image forming section 12 is nipped by an output roller pair 159, then moved back and conveyed to a reverse conveyance path 195 by the output roller pair 159, and conveyed again upstream of the nip N and the fixing section 13 in a direction of conveyance of the recording paper sheet P by a conveyance roller pair 19. Thus, an image is formed on the other side of the recording paper sheet P by the image forming section 12.

The structure of the image forming apparatus 1 will next be described. FIG. 3 is a functional block diagram showing an essential internal architecture of the image forming apparatus 1.

The image forming apparatus 1 includes a control unit 10. The control unit 10 is composed of a CPU (central processing unit), a RAM, a ROM, a dedicated hardware circuit, and so on and governs the overall operation control of the image forming apparatus 1.

The document reading section 5 is under the control of the control unit 10 and includes a reader 163 including a lighting part, a CCD sensor, and so on. The document reading section 5 is configured to read an image from an original document by irradiating the document with light from the lighting part and receiving the reflected light on the CCD sensor.

An image processing section 31, if necessary, processes image data of the image read by the document reading section 5. For example, in order that the image read by the document reading section 5 is improved in quality after the formation of an image in the image forming section 12, the image processing section 31 performs predetermined image processing, such as shading correction.

An image memory 32 provides a region for temporarily storing data of image of the original document read by the document reading section 5 and temporarily storing data to be printed by the image forming section 12.

The image forming section 12 is configured to form an image of print data read by the document reading section 5, an image of print data received from the network-connected computer 200, or the like.

The operating section 47 is configured to receive operator's commands for various types of operations and processing executable by the image forming apparatus 1. The operating section 47 includes a display 473.

The display 473 is configured to, while the image forming apparatus 1 is in the normal operation mode, display images of various screens, such as an operating screen, a preview screen, and a screen for checking the status of a print job. On the other hand, while the image forming apparatus 1 is in the sleep mode, the display 473 is turned off.

A facsimile communication section 71 includes a coding/decoding section, a modulation/demodulation section, and an NCU (network control unit), all of which are not illustrated, and performs facsimile communication using a public telephone network.

A network interface section 91 is constituted by a communication module, such as a LAN board, and transfers various data to and from computers 200 and the like in a local area via a LAN or the like connected to the network interface section 91.

An HDD 92 is a large storage device capable of storing document images and the like read by the document reading section 5.

The human body sensors 50A and 50B are configured to detect an operator coming close to the image forming apparatus 1 and thus issue a detection signal.

A drive motor 70 is a drive source for applying a rotary drive force to various rotary members of the image forming section 12, the conveyance roller pair 19, and so on.

The control unit 10 includes the control section 100, an operation recording section 101, a mode shift section 102, and a setting section 103.

The operation recording section 101 is configured to record whether or not the operating section 47 has been operated within a predetermined time (for example, 10 seconds) of the human body sensor 50A or 50B detecting the operator coming close to the image forming apparatus 1. The operation recording section 101 records, for each of the human body sensors 50A and 50B, the above record as an operation history.

The control section 100 is connected to the document reading section 5, the document feed section 6, the image processing section 31, the image memory 32, the image forming section 12, the operating section 47, the facsimile communication section 71, the network interface section 91, the HDD (hard disk drive) 92, the human body sensors 50A and 50B, and so on and controls the operations of these components.

The mode shift section 102 is configured to, based on the presence or absence of the detection signal from the human body sensors 50A and 50B, shift the image forming apparatus 1 from the normal operation mode allowing the image forming apparatus 1 to normally operate to the sleep mode for saving power or vice versa.

The setting section 103 is configured to, based on the operation histories recorded in the operation recording section 101, set as a sleep non-cancel sensor uninvolved in cancelling the sleep mode, out of the human body sensors 50A and 50B, a human body sensor for which an operation of the operating section 47 within the predetermined time of detecting an operator coming close to the image forming apparatus 1 occurred with a frequency not higher than a predetermined value.

Furthermore, the mode shift section 102 is configured to, when, during the sleep mode of the image forming apparatus 1, receiving the detection signal from the sleep non-cancel sensor, maintain the image forming apparatus 1 in the sleep mode. On the other hand, when, during the sleep mode, receiving the detection signal from the human body sensor other than the sleep non-cancel sensor, shifts the image forming apparatus 1 to the normal operation mode.

Figure 4A:
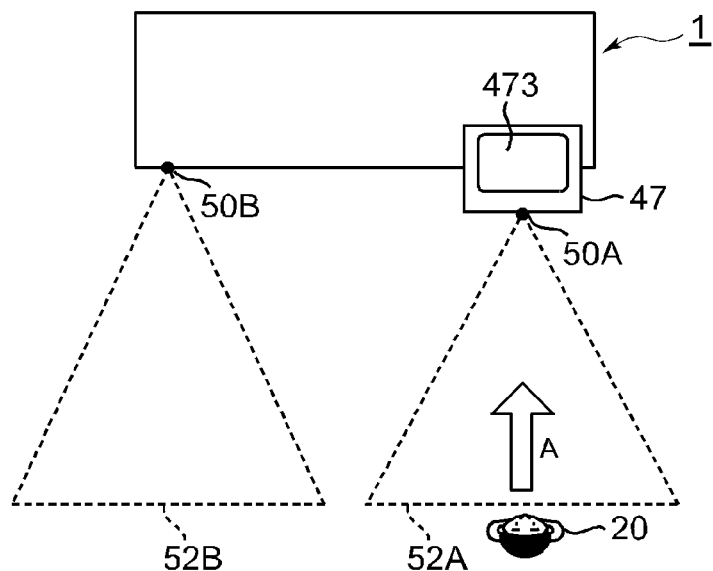
FIGS. 4A and 4B are illustrations showing how each of the human body sensors detects an operator when the image forming apparatus is placed on the center of a floor.
Figure 4B:
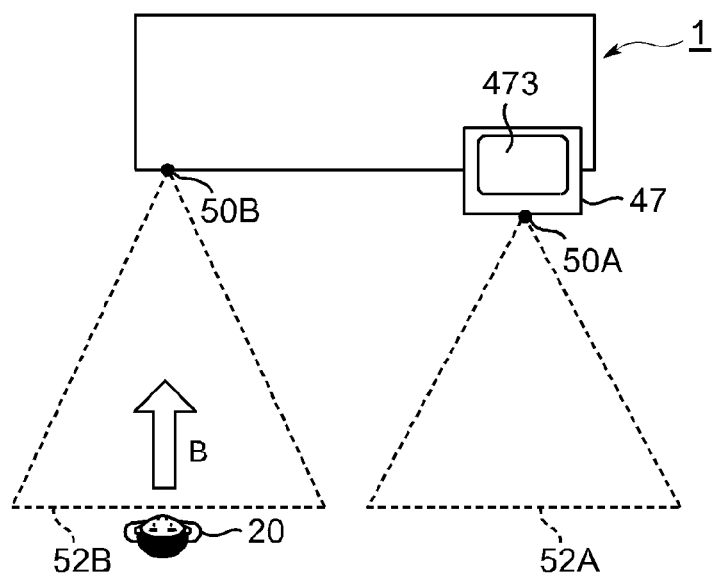

FIGS. 4A and 4B are illustrations showing how each of the human body sensors detects an operator when the image forming apparatus 1 is placed on the center of a floor. FIG. 4A illustrates a situation where an operator 20 is coming close to the image forming apparatus 1 from substantially in front of the operating section 47 in the direction of the arrow A in order to operate the operating section 47. For example, when the operator 20 enters the sensing range 52A, the human body sensor 50A detects the operator 20. In this case, if the operating section 47 is operated by the operator 20 within the predetermined time of the human body sensor 50A detecting the operator coming close to the image forming apparatus 1, the operation recording section 101 counts up the number of times of operation after the detection of the operator by the human body sensor 50A by one.

On the other hand, if the operating section 47 is not operated within the predetermined time of the human body sensor 50A detecting the operator 20, the operation recording section 101 does not count up the number of times of operation after the detection of the operator by the human body sensor 50A.

Also when the human body sensor 50B detects an operator 20, the operation recording section 101, like the case of the human body sensor 50A, counts up or does not count up the number of times of operation depending upon whether or not the operating section 47 is operated by the operator 20 within the predetermined time of the detection of the operator 20 by the human body sensor 50B.

FIG. 4B illustrates a situation where an operator 20 is coming close to the image forming apparatus 1 from substantially in front of the paper output tray disposed at the left side of the image forming apparatus 1 in the direction of the arrow B in order to pick up a recording paper sheet discharged from the image forming apparatus 1. For example, if the operator 20 enters the sensing range 52B from in front of the image forming apparatus 1 and the human body sensor 50B detects the operator 20, but the operator 20 simply picks up a recording paper sheet discharged from the post-processing device 2 and the operating section 47 is not operated within the predetermined time of the detection of the operator 20 by the human body sensor 50B, the operation recording section 101 does not count up the number of times of operation after the detection of the operator by the human body sensor 50B.

Here, suppose that within a given period, for example, within a period on day basis, such as one to seven days, the following condition is repeated a plurality of times: in the situation shown in FIG. 4A, an operator is detected by the human body sensor 50A and the operation recording section 101 counts up the number of times of operation after the detection of the operator by one; and then, as in the situation shown in FIG. 4B, an operator is detected by the human body sensor 50B but the operation recording section 101 does not count up the number of times of operation after the detection of the operator. In this case, out of the operation histories recorded in the operation recording section 101 within the given period, the operation history associated with the human body sensor 50A shows that the operation of the operating section 47 within the predetermined time of detecting the operator occurred with a high frequency, while the operation history associated with the human body sensor 50B shows that the same occurred with a low frequency. In this regard, if the low frequency is not higher than a value predetermined as a low value (for example, twice within the given period), the setting section 103, based on the operation history recorded in the operation recording section 101, sets the human body sensor giving the low frequency, i.e., the human body sensor 50B in this example, as a sleep non-cancel sensor. Thus, even if at a later time the human body sensor 50B detects an operator 20, as in FIG. 4B, during the sleep mode of the image forming apparatus 1, the mode shift section 102 does not cancel the sleep mode of the image forming apparatus 1 and maintains the image forming apparatus 1 in the current mode. Under the control of the control section 100, the display 473 is kept in an image non-display state (including image non-display due to turn-off of the backlight). On the other hand, when the human body sensor 50A detects an operator 20 as in FIG. 4A, the mode shift section 102 cancels the sleep mode of the image forming apparatus 1 and shifts the image forming apparatus 1 to the normal operation mode. Thus, under the control of the control section 100, the display 473 displays an image of a predetermined screen, for example, a menu screen.

As described above, in this embodiment, out of the human body sensors 50A and 50B, a human body sensor for which the operation of the operating section 47 within the predetermined time of detecting an operator coming close to the image forming apparatus 1 occurred with a low frequency is set as a sleep non-cancel sensor. Even if the sleep non-cancel sensor detects a human body, the image forming apparatus 1 does not return from the sleep mode to the normal operation mode.

Unlike this, a general image forming apparatus may return automatically from the sleep mode to the normal operation mode even when a user having no intention to operate the image forming apparatus comes close to the image forming apparatus. For example, even in an image forming apparatus in which measures are taken against the shift of the image forming apparatus to the sleep mode with timing not intended by the operator, no measures are considered against the automatic return of the image forming apparatus from the sleep mode to the normal operation mode when not intended by a user.

In contrast, the image forming apparatus 1 according to this embodiment, in the case where the operator does not operate the operating section 47 and therefore there is no need to shift the image forming apparatus 1 from the sleep mode to the normal operation mode, i.e., when not intended by the operator, can prevent the return from the sleep mode to the normal operation mode, which provides further power saving of the image forming apparatus 1.

Figure 5:
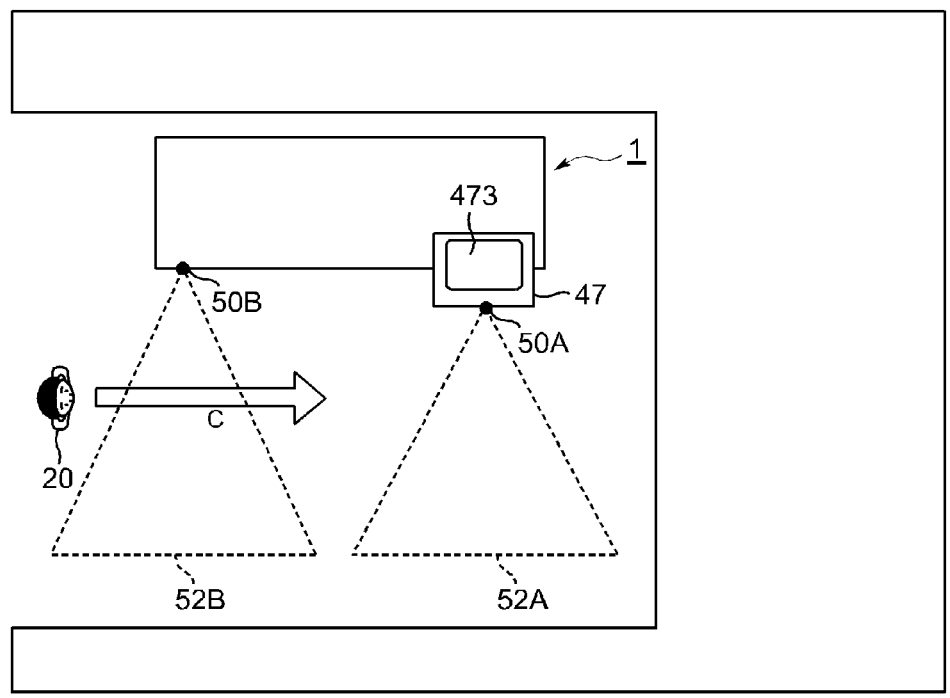
FIG. 5 is an illustration showing how each of the human body sensors detects an operator when the image forming apparatus is placed on a corner of a floor.

FIG. 5 is an illustration showing how each of the human body sensors detects an operator when the image forming apparatus 1 is placed on a corner of a floor. FIG. 5 illustrates a situation where an operator 20 is going from the left side of the image forming apparatus 1 in FIG. 5 to the right side thereof, in which the operating section 47 is located, in the direction of the arrow C in order to operate the operating section 47.

For example, when the operator 20 enters the sensing range 52B, the human body sensor 50B detects the operator 20. Subsequently, when the operator 20 enters the sensing range 52A, the human body sensor 50A detects the operator 20. In this instance, the operating section 47 is operated after both the human body sensors 50A and 50B detect the operator 20. Therefore, the operation recording section 101 counts up the number of times of operation after the detection of the operator by a combination of the human body sensors 50A and 50B by one.

Suppose a scenario that the event of FIG. 5 is repeated a plurality of times and the operation history associated with the above combination and recorded in the operation recording section 101 within the aforementioned given period shows that the operation of the operating section 47 within the predetermined time of both the human body sensors 50A and 50B of the combination having detected the operator coming close to the image forming apparatus 1 occurred with a high frequency, for example, a frequency higher than the value predetermined as the low value. In this case, the setting section 103 sets the detection of the operator by the combination of the human body sensors 50A and 50B as a requirement for cancelling the sleep mode. In other words, the setting section 103 sets neither the human body sensor 50A nor the human body sensor 50B as a sleep non-cancel sensor. Thereafter, when the human body sensor 50B detects an operator 20, as in FIG. 5, during the sleep mode of the image forming apparatus 1, the mode shift section 102 cancels the sleep mode of the image forming apparatus 1 and shifts the image forming apparatus 1 to the normal operation mode. Thus, under the control of the control section 100, the display 473 displays an image of the menu screen. For example, in the case where the human body sensors 50A and 50B are arranged as shown in FIG. 5, it is highly likely that in operating the operating section 47, an operator 20 first passes through the sensing range of the human body sensor 50B and then reaches the operating section 47. Therefore, the number of times of detection of the operator by the human body sensor 50B is not suitable as an index for determining whether or not the shift from the sleep mode to the normal operation mode is necessary. In this example, whether or not to set the human body sensor 50B as a sleep non-cancel sensor is determined based not on the number of times of detection of the operator 20 by the human body sensor 50B only but on the number of times of detection of the operator 20 by the combination of the human body sensors 50A and 50B. Thus, whether or not the shift from the sleep mode to the normal operation mode is necessary can be accurately determined.

Unlike the above scenario, if in such a situation as in FIG. 5 the operator does not operate the operating section 47 after being detected by the human body sensors 50A and 50B, so that the operation history associated with the combination and recorded in the operation recording section 101 within the given period shows that the frequency of operation of the operating section 47 is not higher than the value predetermined as the low value, the setting section 103 does not set the detection of the operator by the combination of the human body sensors 50A and 50B as a requirement for canceling the sleep mode. In other words, the setting section 103 sets both the human body sensor 50A and 50B as sleep non-cancel sensors.

In these scenarios, the setting section 103 puts a requirement for cancelling the sleep mode depending upon the result of the detection of the operator by the combination of the human body sensors 50A and 50B. Therefore, even if the operator relatively complexly moves in front of the image forming apparatus 1, whether or not to cancel the sleep mode can be set based on both the detection of the operator by the human body sensor 50A and the number of times of detection of the operator by the human body sensor 50B. Thus, in the case of such an operator's movement that he/she does not operate the operating section 47 and therefore there is no need to shift the image forming apparatus 1 from the sleep mode to the normal operation mode, the return from the sleep mode to the normal operation mode can be more accurately prevented, which provides still further power saving of the image forming apparatus 1.

The human body sensors 50A and 50B give to the control section 100 an interrupt notice of the operator coming close to the image forming apparatus 1. Thus, immediately after any human body sensor other than the sleep non-cancel sensor detects the operator coming close to the image forming apparatus, the display 473 lights up, which improves user convenience.

The above embodiment shows an example where the image forming apparatus 1 includes two human body sensors. However, also in embodiments where the image forming apparatus 1 includes three or more human body sensors, the setting section 103, like the above embodiment, may set the sleep non-cancel sensor based on how frequently the operation of the operating section 47 after the detection of the operator by each human body sensor or any combination of the human body sensors occurred.

Next, a description will be given of operation mode shift processing in the image forming apparatus 1. FIG. 6 is a flowchart showing operation mode shift processing in the image forming apparatus 1. Before the processing starts, the image forming apparatus 1 is set to the sleep mode, in which the control section 100 puts the display 473 into an image non-display state. When in this state an operator comes close to the image forming apparatus 1, the human body sensor 50A or the human body sensor 50B detects the operator coming close thereto (YES in S1).

When the human body sensor 50A or the human body sensor 50B detects the operator, the mode shift section 102 checks the source of the detection signal (S2). The mode shift section 102 determines whether or not the source is a sleep non-cancel sensor. If the sleep non-cancel sensor have issued the detection signal (YES in S3), the mode shift section 102 maintains the image forming apparatus 1 in the sleep mode (S4). On the other hand, if any human body sensor other than the sleep non-cancel sensor(s) has issued the detection signal (NO in S3), the mode shift section 102 shifts the image forming apparatus 1 to the normal operation mode (S5). Based on this shift to the normal operation mode, the control section 100 causes the display 473 to display an image of the menu screen or the like (S5).

The present disclosure is not limited to the above embodiment and can be modified in various ways. For example, the above embodiment shows an example where the human body sensors 50A and 50B are arranged at horizontally different locations. However, like the human body sensors 50A' and 50B' shown by the broken lines in FIG. 1, both the sensors may be arranged at different locations in a vertical direction (a top-to-bottom direction of the image forming apparatus 1). In the case where the human body sensors 50A and 50B are arranged at vertically different locations, whether or not the shift from the sleep mode to the normal operation mode is necessary can be accurately determined for each of operators of different heights cutting across in front of or coming close to the image forming apparatus 1 (for each of the heights of objects present in front of the image forming apparatus 1).

Although the description of the above embodiment is given taking the image forming apparatus 1 formed of a multifunction peripheral as an example of the electronic apparatus according to the present disclosure, the example is merely illustrative and the electronic apparatus may be any other image forming apparatus, such as a printer, a copier or a facsimile machine or any other electronic apparatus, such as medical equipment or a display.

The structure and processing shown in the above embodiment with reference to FIGS. 1 to 6 are merely illustrative of the present disclosure and not intended to limit the present disclosure to the above particular structure and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An electronic apparatus comprising:
   an operating section configured to receive an operation command from an operator;
   a plurality of human body sensors configured to detect an operator coming close to the electronic apparatus and thus issue a detection signal and disposed at different locations on a front side of the electronic apparatus;
   a mode shift section configured to, based on a presence or absence of the detection signal from the human body sensor, shift the electronic apparatus from a normal operation mode allowing the electronic apparatus to normally operate to a sleep mode for saving power, or vice versa;
   an operation recording section configured to, for each of the human body sensors, record as an operation history whether or not the operating section has been operated within a predetermined time of the human body sensor detecting an operator coming close to the electronic apparatus; and
   a setting section configured to, based on the operation history recorded in the operation recording section, set as a sleep non-cancel sensor uninvolved in cancelling the sleep mode, out of the plurality of human body sensors, a human body sensor for which an operation of the operating section within the predetermined time of detecting an operator coming close to the electronic apparatus occurred with a frequency not higher than a predetermined value,
   wherein the mode shift section is configured to determine whether or not to cancel the sleep mode based on whether the detection signal is coming from the sleep non-cancel sensor or the human body sensor during the sleep mode of the electronic apparatus, and to maintain the electronic apparatus in the sleep mode when the detection signal is coming from the sleep non-cancel sensor, and shift the electronic apparatus to the normal operation mode when the detection signal is coming from the human body sensor.

2. The electronic apparatus according to claim 1, wherein the plurality of human body sensors are arranged at horizontally different locations.

3. The electronic apparatus according to claim 1, wherein the plurality of human body sensors are arranged at vertically different locations.

4. The electronic apparatus according to claim 1, wherein the operation recording section is configured to, for each of various combinations of the plurality of human body sensors, record as an operation history whether or not the operating section has been operated within a predetermined time of both the human body sensors of the combination detecting an operator coming close to the electronic apparatus, and the setting section is configured to set as the sleep non-cancel sensor, out of the combinations of human body sensors associated with the operation histories recorded in the operation recording section, each human body sensor forming a combination of human body sensors for all of which an operation of the operating section within the predetermined time of detecting an operator coming close to the electronic apparatus occurred with a frequency not higher than the predetermined value.

5. The electronic apparatus according to claim 4, wherein the plurality of human body sensors are arranged at horizontally different locations.

6. The electronic apparatus according to claim 1, further comprising:

a display configured to display an image; and a control section configured to control the display to, during the normal operation mode of the electronic apparatus, allow the display to display an image and, during the sleep mode of the electronic apparatus, prevent the display from displaying any image and configured to, when the electronic apparatus is shifted from the sleep mode to the normal operation mode by the mode shift section, allow the display to display an image.

7. An image forming apparatus, being the electronic apparatus according to claim 1 and comprising an image forming section configured to form an image on a recording medium.

\* \* \* \* \*